(12) United States Patent
Yang et al.

(10) Patent No.: US 10,558,306 B2
(45) Date of Patent: Feb. 11, 2020

(54) IN-CELL TOUCH APPARATUS AND A WATER MODE DETECTION METHOD THEREOF

(71) Applicant: HIMAX TECHNOLOGIES LIMITED, Tainan (TW)

(72) Inventors: Fong-Wei Yang, Tainan (TW); Chun-Kai Chuang, Tainan (TW); Chih-Chen Tsai, Tainan (TW); Chung-Wen Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 123 days.

(21) Appl. No.: 15/620,393

(22) Filed: Jun. 12, 2017

(65) Prior Publication Data
US 2018/0356931 A1 Dec. 13, 2018

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01); *G06F 3/0412* (2013.01); *G06F 2203/04104* (2013.01)

(58) Field of Classification Search
CPC .................................. G06F 3/044; G06F 3/0416
See application file for complete search history.

(56) References Cited

U.S. PATENT DOCUMENTS

| | | | |
|---|---|---|---|
| 8,717,331 B2 | 5/2014 | Kremin et al. | |
| 2012/0050214 A1* | 3/2012 | Kremin | G06F 3/0418 345/174 |
| 2014/0022207 A1* | 1/2014 | Shimizu | G06F 3/0418 345/174 |
| 2014/0132560 A1 | 5/2014 | Huang et al. | |
| 2016/0117014 A1* | 4/2016 | Davison | H03K 17/962 345/174 |
| 2018/0150183 A1* | 5/2018 | Putra | G06F 3/0418 |

FOREIGN PATENT DOCUMENTS

TW 201512913 4/2015
WO 2016069642 5/2016

OTHER PUBLICATIONS

"Office Action of Taiwan Counterpart Application," dated Dec. 21, 2017, p. 1-p. 9, in which the listed references were cited.

* cited by examiner

*Primary Examiner* — Kevin M Nguyen
(74) *Attorney, Agent, or Firm* — J.C. Patents

(57) ABSTRACT

A water mode detection method includes: operating a normal touch detection operation on each of a plurality of touch detection unit groups during each of a plurality of normal scan periods to obtain a first detection result; operating a dummy touch detection operation on a first touch detection group of the touch detection unit groups to obtain a second detection result during a dummy scan period, and setting a common voltage of a second touch detection group of a plurality of non-scanned touch detection unit groups to a reference ground during the dummy touch detection operation; and generating a water mode detection result according to the first detection result and the second detection result.

8 Claims, 10 Drawing Sheets

IN-CELL TOUCH APPARATUS AND A WATER MODE DETECTION METHOD THEREOF

BACKGROUND

Field of the Invention

The invention is directed to an in-cell touch apparatus and more particularly, to a water mode detection method for the in-cell touch apparatus.

Description of Related Art

For providing a convenience human-machine interface, a touch panel integrated with display panel is widely used in consumer electronic product. Accordingly, an in-cell touch panel and an on-cell touch panel are provided in conventional art.

In conventional art, if only water touches the in-cell touch panel, the in-cell touch panel can ignore the water during a normal touch detection operation. But, if the water touches the in-cell touch panel with a touch medium (ex. finger of a user), a large touch area can be sensed. Please be noted here, in the conventional art, the in-cell touch panel provides a palm rejection function, and the large touch area can be rejected by the palm rejection function. That is, a requirement of user cannot be met if the in-cell touch panel operating in a water detection mode.

SUMMARY

The invention provides an in-cell touch apparatus and a water mode detection method thereof for detecting a touch point in a water mode.

The water mode detection method includes: operating a normal touch detection operation on each of a plurality of touch detection unit groups during each of a plurality of normal scan periods to obtain a first detection result; operating a dummy touch detection operation on a first touch detection group of the touch detection unit groups to obtain a second detection result during a dummy scan period, and setting a common voltage of a second touch detection group of a plurality of non-scanned touch detection unit groups to a reference ground during the dummy touch detection operation; and generating a water mode detection result according to the first detection result and the second detection result.

The in-cell touch apparatus includes a touch panel, a touch detector, a common voltage provider and a controller. The touch panel has a plurality of touch detection unit groups. The touch detector is coupled to the touch detection unit groups, and is configured to: operate a normal touch detection operation on each of the touch detection unit groups during each of a plurality of normal scan periods to obtain a first detection result; and operate a dummy touch detection operation on a first touch detection group of the touch detection unit groups to obtain a second detection result during a dummy scan period. The common voltage provider is coupled to the touch detection unit groups, and sets a common voltage of a second touch detection group of a plurality of non-scanned touch detection unit groups to a reference ground during the dummy touch detection operation. The controller is coupled to the touch detector and the common voltage provider, receives the first detection result and the second detection result, and generates a water mode detection result according to the first detection result and the second detection result.

To sum up, the invention operates normal touch detections during and a plurality of normal scan periods to generate a first detection result, and operates a dummy touch detection during one dummy scan period to generate a second detection result. The invention further generate a water mode detection result by comparing the first detection result and the second detection result. Such as that, if a touch medium touches a water area on the in-cell touch panel, the touch action can be detected, and a system of the in-cell touch panel can be operated normally.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
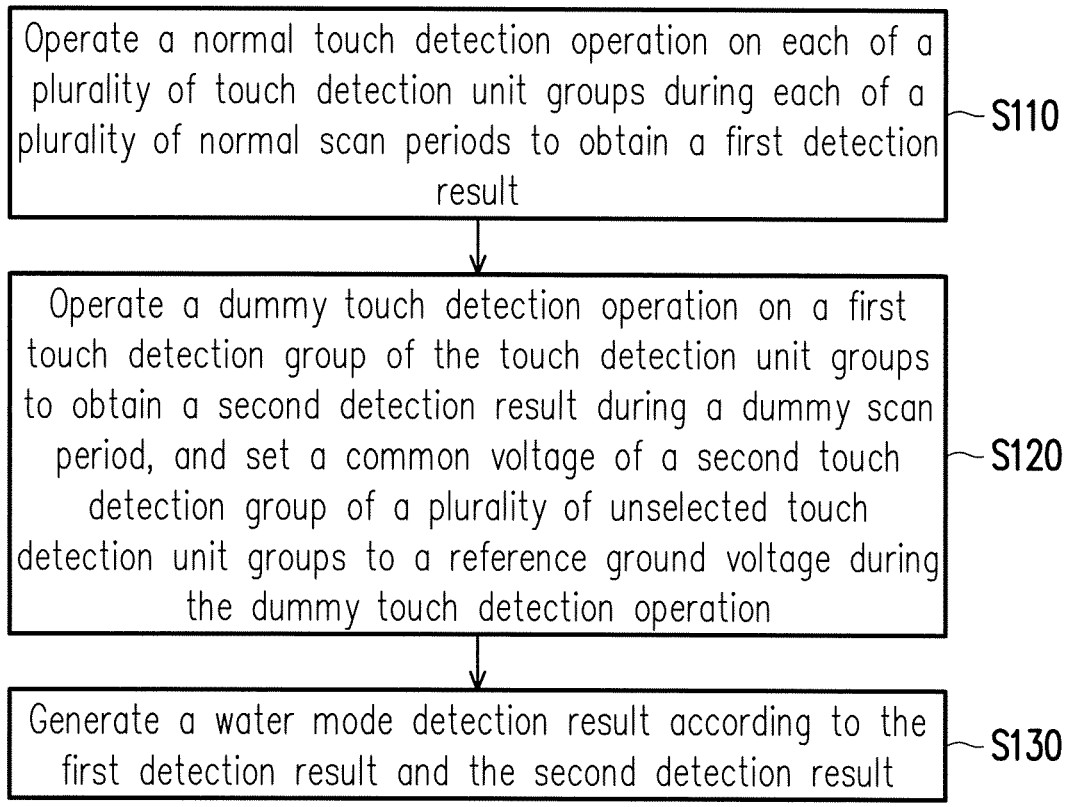
FIG. 1 illustrates a flow chart of a water mode detection method according to an embodiment of present disclosure.

Please refer to FIG. 1, which illustrates a flow chart of a water mode detection method according to an embodiment of present disclosure. In an in-cell touch panel, all of touch pads of the in-cell touch panel can be divided into a plurality of touch detection unit groups. In step S110, a normal touch detection operation is operated, and the normal touch detection operation is operated on each of the touch detection unit groups during each of a plurality of normal scan periods. For example, if the in-cell touch panel includes ten touch detection unit groups, the step S110 may operate the normal touch detection operation on ten normal scan periods, and the ten touch detection unit groups are respectively scanned on the ten normal scan periods. Moreover, after the ten touch detection unit groups are scanned, a first detection result can be obtained.

Figure 2A:
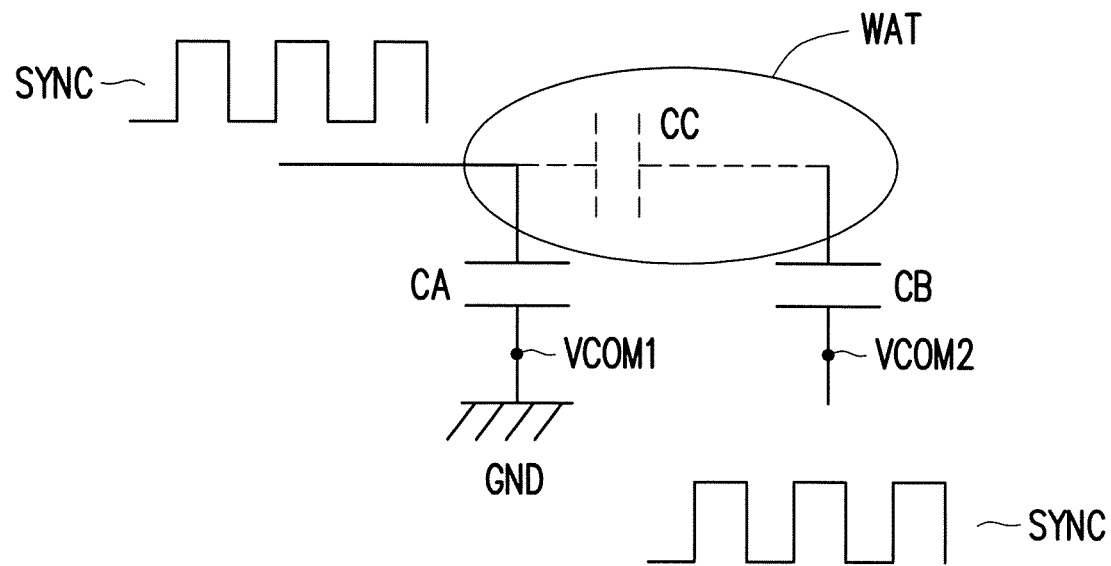
FIG. 2A illustrates a schematic diagram of the touch capacitance during the normal touch detection operation according to an embodiment of present disclosure.

Referring to FIG. 2A, which illustrates a schematic diagram of the touch capacitance during the normal touch detection operation according to an embodiment of present disclosure. During a first scan period of the normal scan periods, a synchronous signal SYNC may be transported to a first touch detection unit group and a common voltage VCOM1 of the first touch detection unit group is set to a reference ground GND. Further, the synchronous signal SYNC may also transported to be common voltages VCOM2 of the non-scanned touch detection unit groups (ex. second to tenth touch detection unit groups). If water WAT covers on and between a touch pad of the first touch detection unit group and a touch pad of the non-scanned touch detection unit groups, a capacitor CC can be formed between a capacitor CA of the first touch detection unit group and a capacitor CB of the non-scanned touch detection unit groups, where the capacitor CA is neighbored to the capacitor CB. Since the common voltages VCOM2 of the non-scanned touch detection unit groups is the synchronous signal SYNC, a capacitance variation of the capacitor CC and CB is not response in the first scan period.

According to the description mentioned above, if all of the touch detection unit groups have been scanned, the first touch detection result without water information can be obtained.

Referring to FIG. 1 again, in the step S120, a dummy touch detection operation on a first touch detection group of the touch detection unit groups during a dummy scan period can be operated. In the step S120, the common voltage of the second touch detection group which is non-scanned touch detection unit group is set to the reference ground during the dummy touch detection operation, and a second touch detection result can be obtained.

Figure 2B:
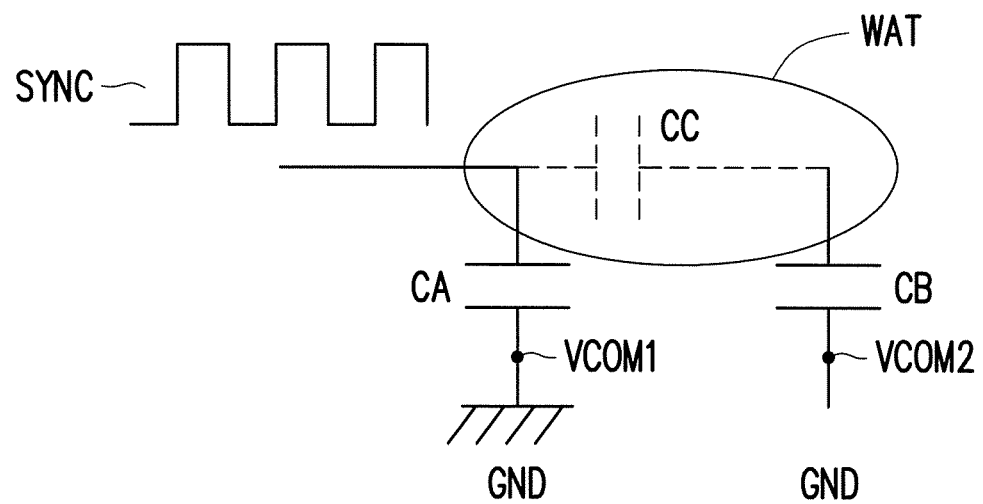
FIG. 2B illustrates a schematic diagram of the touch capacitance during the dummy touch detection operation according to an embodiment of present disclosure.

In detail, refer to FIG. 2B, which illustrates a schematic diagram of the touch capacitance during the dummy touch detection operation according to an embodiment of present disclosure. During the dummy scan period, the touch pad of the first touch detection group receives the synchronous signal SYNC, and the common voltage VCOM2 of the touch pad of the second touch detection group is set to the reference ground GND. Such as that, information of the water WAT touching the touch pads of the first and second touch detection groups can be response to the second touch detection result.

It should be noted here, since touch pads of one touch detection group are scattered disposed in the in-cell touch panel. That is, the dummy scan period with only one scan period can be used to determine whether there is water touching the in-cell touch panel or not.

Furthermore, in another embodiment of present disclosure, number of the second touch detection group may be 2 or more.

Referring to FIG. 1 again, in the step S130, by comparing the first touch detection result and the second touch detection result, a water mode detection result can be obtained.

Figure 3:
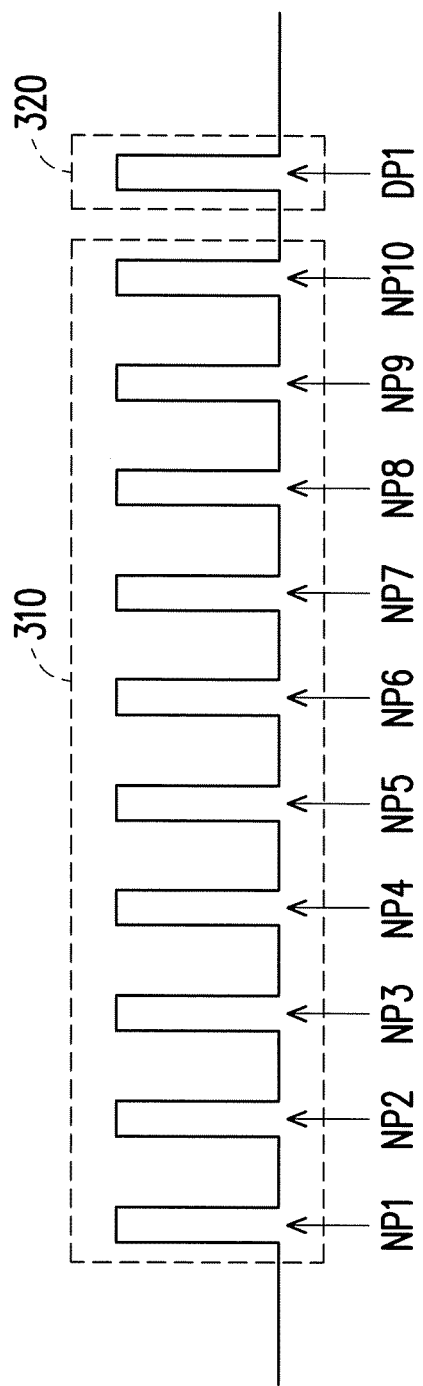
FIG. 3 illustrates a waveform plot of the water mode detection method according to an embodiment of present disclosure.

Referring to FIG. 3, which illustrates a waveform plot of the water mode detection method according to an embodiment of present disclosure. The water mode detection method includes a normal touch detection operation 310 and a dummy touch detection operation 320. The normal touch detection operation 310 includes normal scan periods NP1-NP10, and the dummy touch detection operation 320 merely includes one dummy scan period DP1. For example, during the normal touch detection operation 310, a selector may select the touch detection unit groups of the in-cell touch panel one by one according to the normal scan periods NP1-NP10. In one of the normal scan periods NP1-NP10, touch pads of one of the touch detection unit groups are selected to be coupled to a plurality of analog-to digital converters. The analog-to digital converters may output detection results by sensing capacitance variations of the touch pads. After the normal scan period NP10 all of the touch detection unit groups of the in-cell touch panel have been scanned, and the first touch detection result can be obtained.

During the dummy touch detection operation 320, one of the touch detection unit groups is selected and scanned during the dummy scan period DP1. By setting the common voltage of one or more touch detection unit groups which is not scanned to be the reference ground, whether there is water touching the in-cell touch panel or not can be determined.

It should be noted here, during the normal touch detection operation, water on the in-cell touch panel without contacting to a touch medium can be ignored. But, during the normal touch detection operation, the water contacting to the touch medium can be ignore because of a palm rejection function. When a large touch area have been sensed, in the present embodiment, if the second detection result indicates there is water touching the in-cell touch panel, the palm rejection function can be disabled, and the touch area may be touched by the water and the touch medium can be reported out effectively. On the other hand, if the second detection result indicates there is no water touching the in-cell touch panel, the large touch area may be touch by palm and can be ignored by the palm rejection function.

Figure 4A:
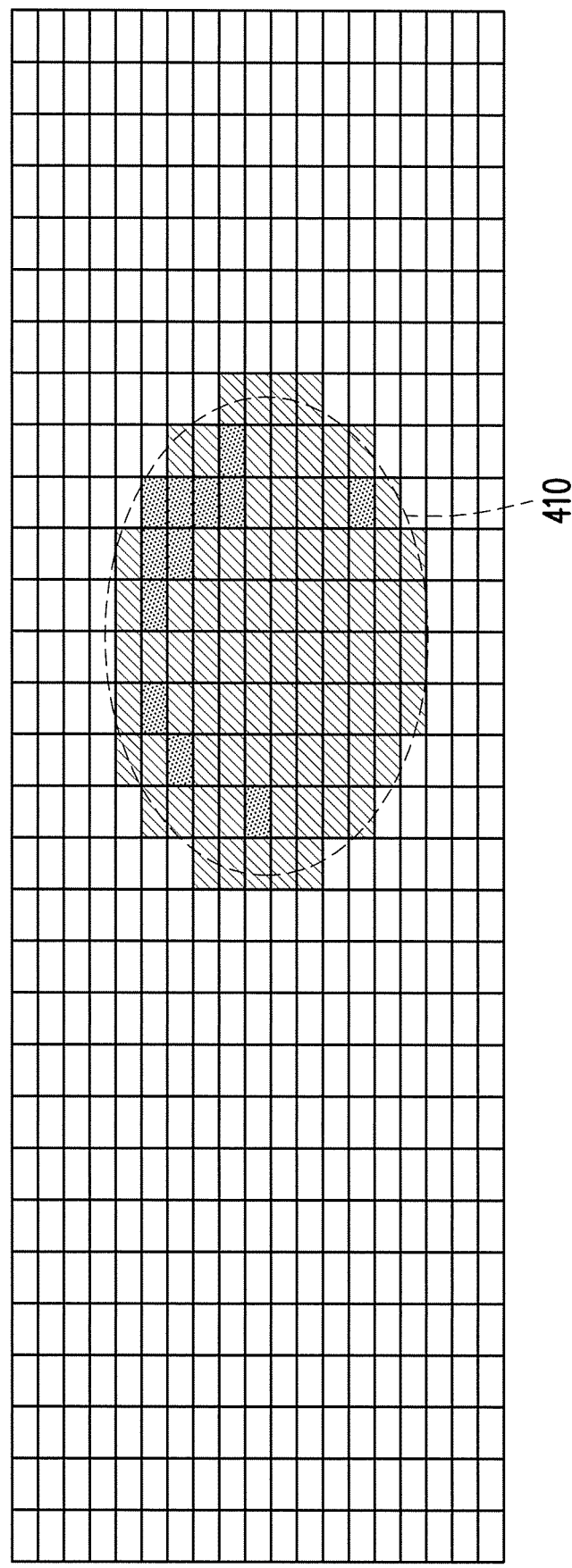
FIG. 4A and FIG. 4B illustrate schematic diagrams of the first and second touch detection results of the water mode detection method according to an embodiment of present disclosure.
Figure 4B:
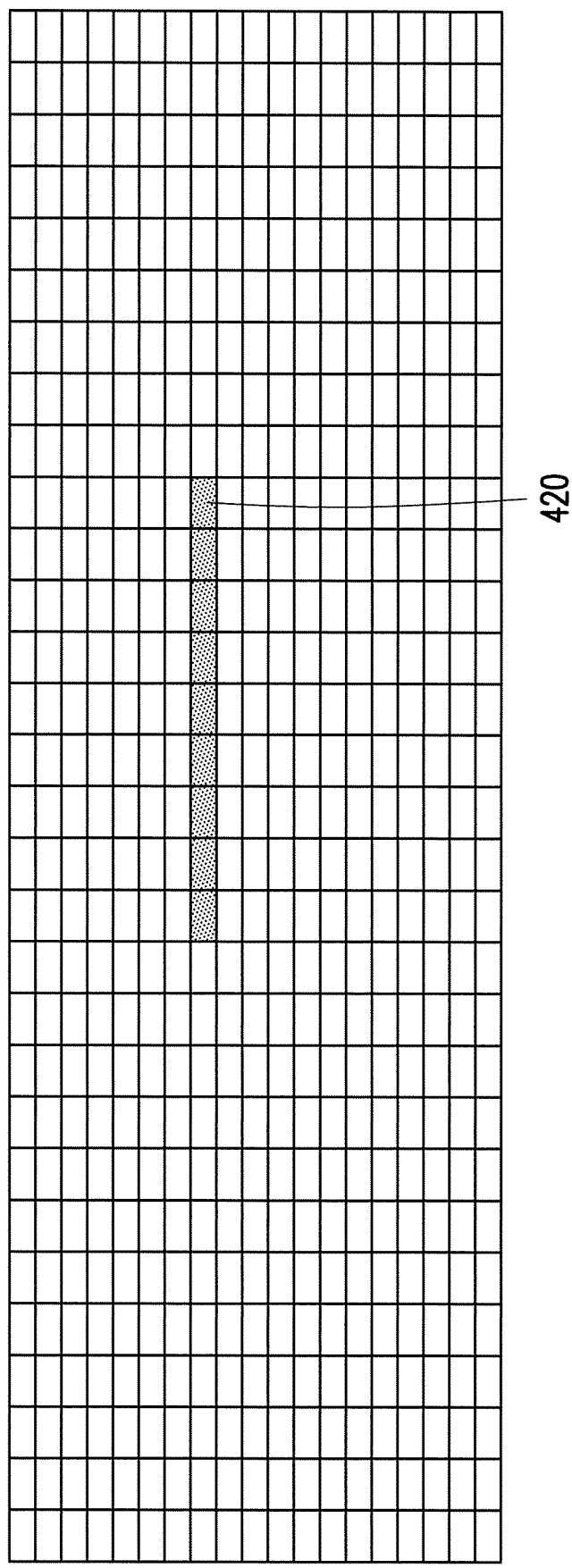

Referring to FIG. 4A and FIG. 4B, which illustrate schematic diagrams of the first and second touch detection results of the water mode detection method according to an embodiment of present disclosure. The FIG. 4A and FIG. 4B respectively represent the first detection result and the second detection result. In FIG. 4A, during the normal touch detection operation, an area 410 with capacitance variation can be sensed. Also by referring to FIG. 4B, during the dummy detection operation, an area 420 with capacitance variation is sensed and there is water touching the in-call touch panel can be determined. Further, by determined the position of the area 410 is closed to the position of the area 420, the area 410 can be determined to be an effective touch point, and the water mode detection result can be obtained.

Figure 5A:
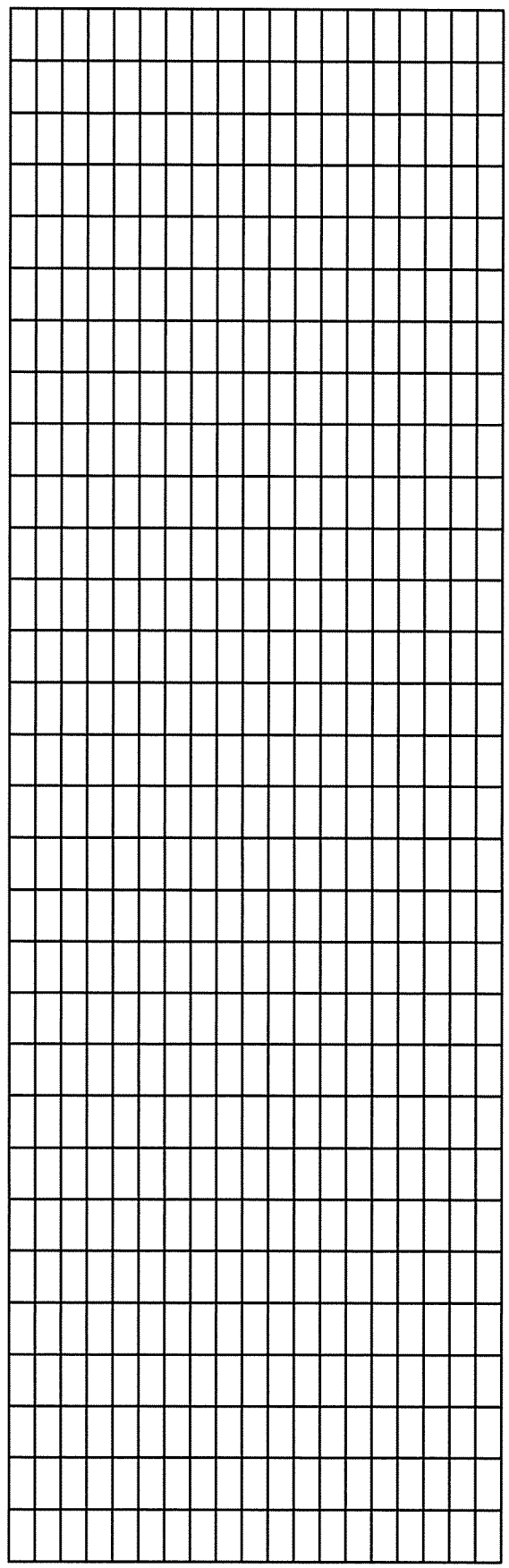
FIGS. 5A, 5B, 6A, and 6B illustrate two possible cases of detection results of the water mode detection method according to an embodiment of present disclosure.
Figure 5B:
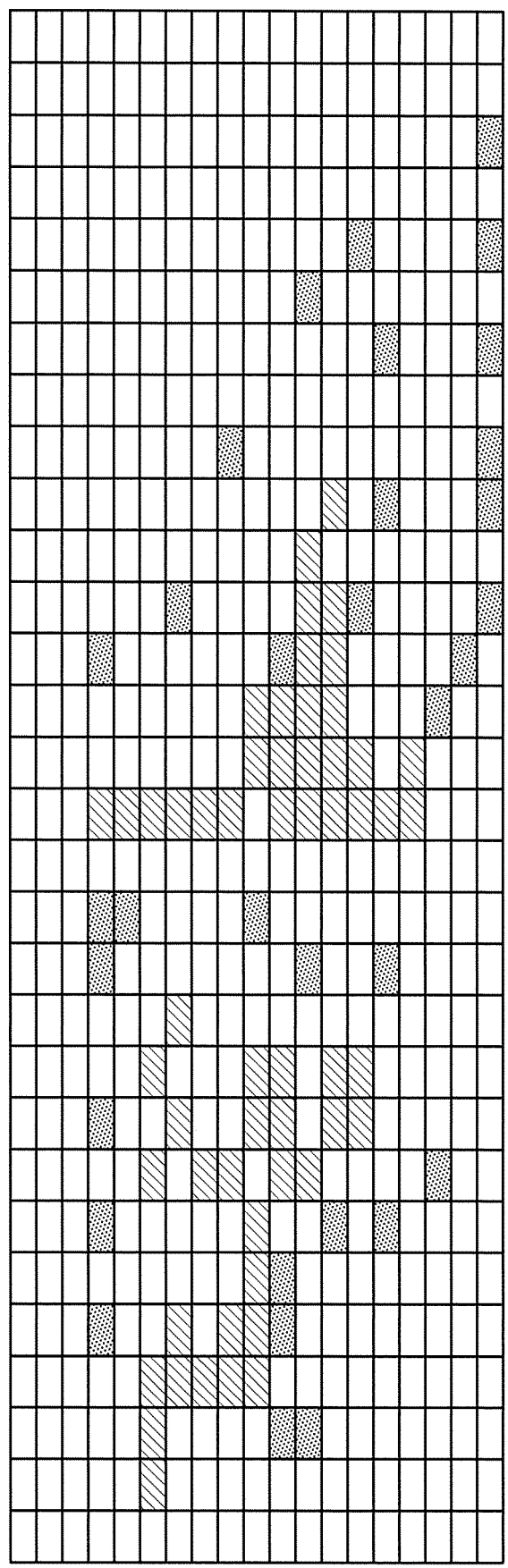

Referring to FIGS. 5A, 5B, 6A, and 6B, which illustrate two possible cases of detection results of the water mode detection method according to an embodiment of present disclosure. In FIG. 5A, during the normal touch detection operation, the first detection result indicates no touch area sensed. But, in FIG. 5B, during the dummy touch detection operation, the second detection result indicates there is water touching the in-cell touch panel. By referring to the first detection result and the second detection result, a first case representing water without contacting a touch medium touching the in-cell touch panel can be determined. In the first case, no touch point should be reported out.

Figure 6A:
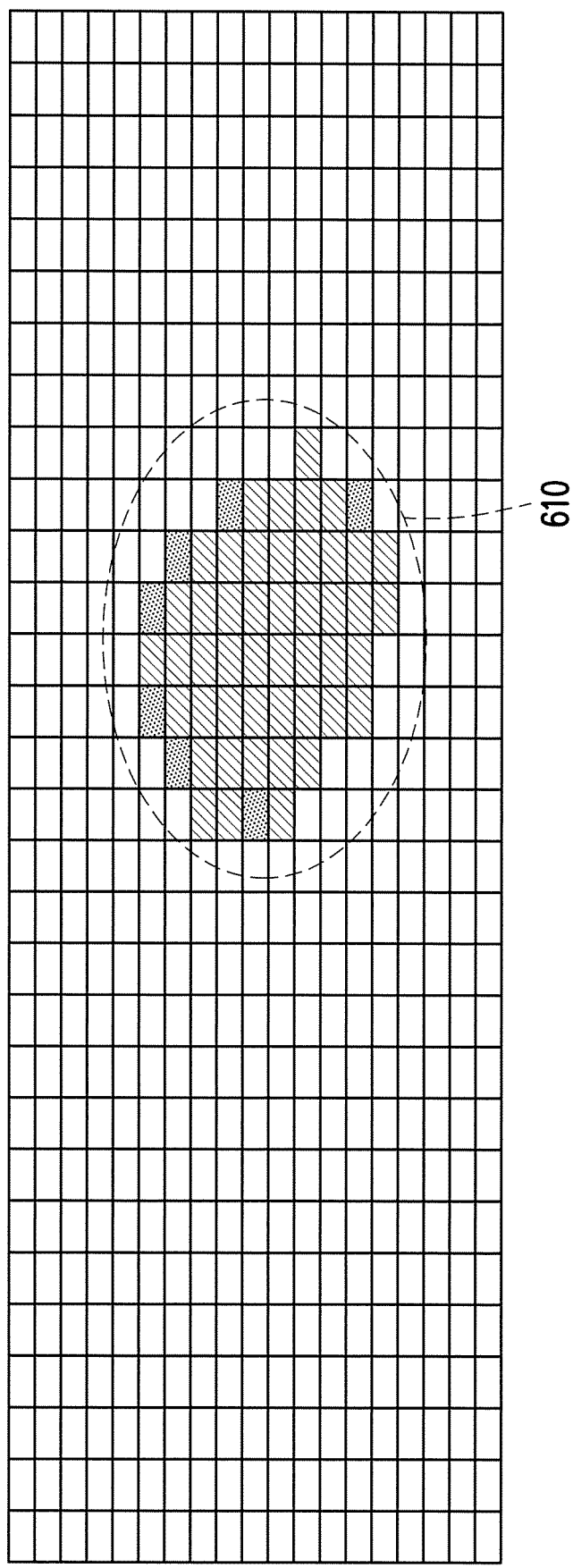
Figure 6B:
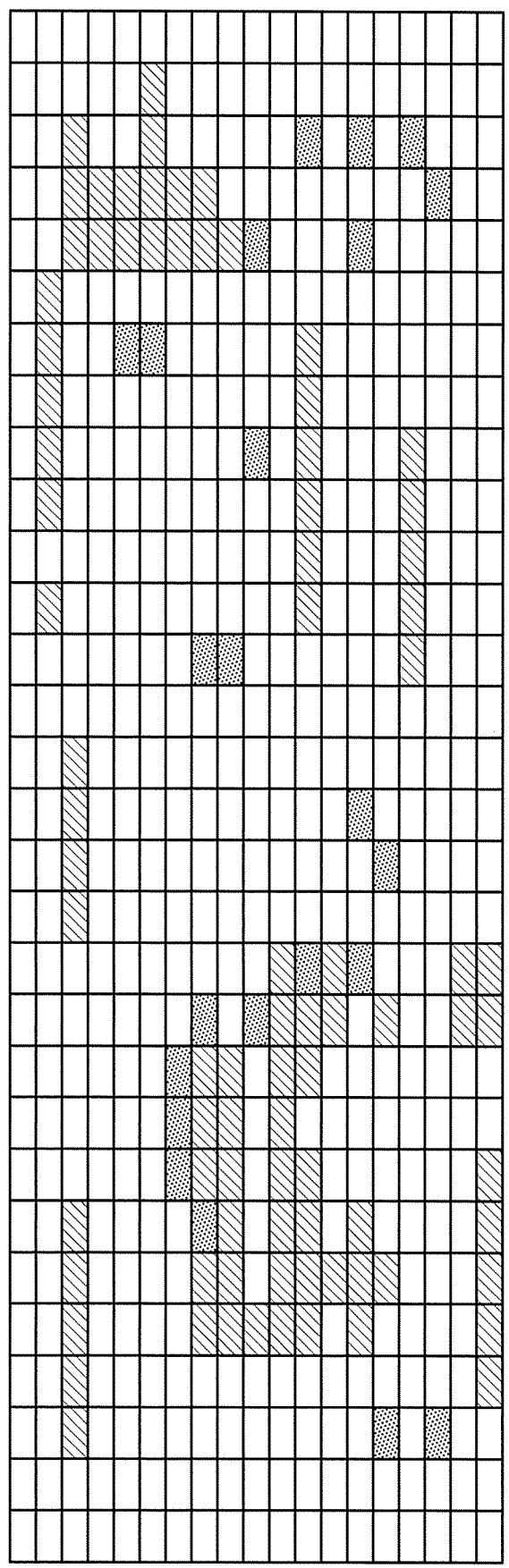

On the other hand, in FIG. 6A, during the normal touch detection operation, a touch area 610 is sensed. In FIG. 6B, during the dummy touch detection operation, the second detection result indicates there is water touching the in-cell touch panel. By referring to the first detection result and the second detection result, a second case representing water contacting a touch medium touching the in-cell touch panel can be determined. In the second case, points of the touch area 610 can be reported out, and is not rejected by the palm rejection function.

Figure 7:
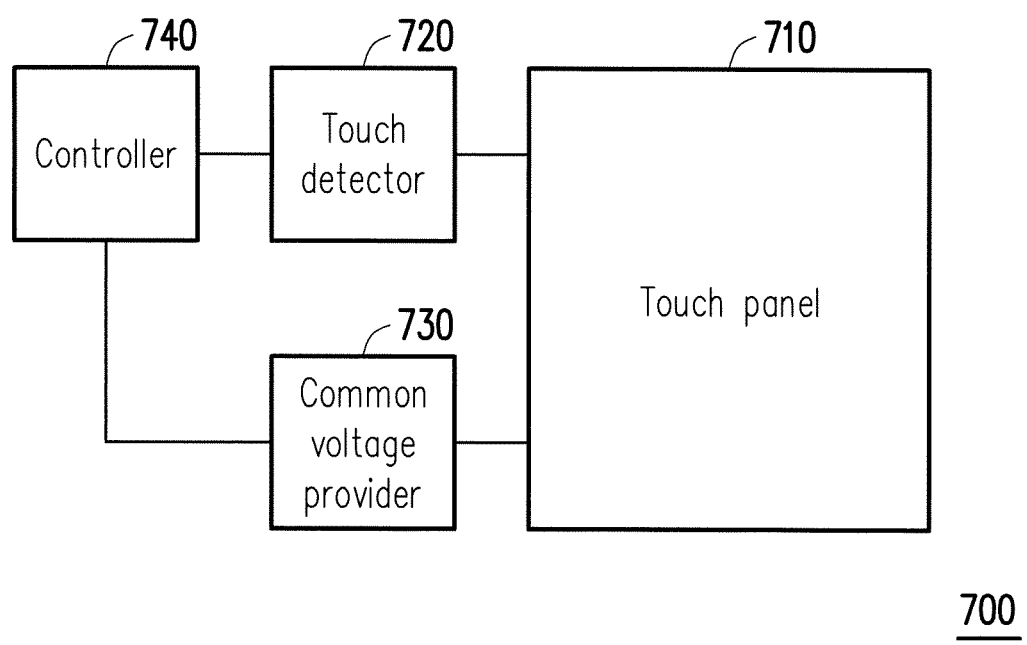
FIG. 7 illustrates a block diagram of an in-cell touch apparatus according to an embodiment of present disclosure.

Referring to FIG. 7, which illustrates a block diagram of an in-cell touch apparatus according to an embodiment of present disclosure. The in-cell touch apparatus 700 includes a touch panel 710, a touch detector 720, a common voltage provider 730 and a controller 740. The touch panel 710 is coupled to the touch detector 720 and the common voltage provider 730. The controller 740 is coupled to the touch detector 720 and the common voltage provider 730. The touch panel 710 has a plurality of touch pads, and the touch pads can be divided into a plurality of detection unit groups. The touch detector 720 is configured to operate a normal touch detection operation on each of the touch detection unit groups during each of a plurality of normal scan periods to obtain a first detection result; and operate a dummy touch detection operation on a first touch detection group of the touch detection unit groups to obtain a second detection result during a dummy scan period. The common voltage provider 730 is configured to set a common voltage of a second touch detection group of a plurality of non-scanned touch detection unit groups to a reference ground during the dummy touch detection operation. The common voltage provider 730 further sends a synchronous signal to be the common voltages of a plurality of non-scanned touch detection unit groups during the normal touch detection operation. The controller 740 receives the first detection result and the second detection result, and generates a water mode detection result according to the first detection result and the second detection result.

Detail operations of the in-cell touch apparatus 700 can be referred to the embodiments above, no more repeated descriptions here.

To conclusion, present disclosure provides a dummy touch detection operation for detecting whether water touches the in-cell touch panel or not. By the touch detection results of the dummy touch detection operation and normal touch detection operation, the case of water touching the in-cell touch panel with touch medium can be identified. That is, user can operate the in-cell touch panel normally in the water detection mode.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A water mode detection method, adapted for an in-cell touch panel, comprising:
    performing a normal touch detection operation on each of a plurality of touch detection pad groups during each of a plurality of normal scan periods by providing a sensing signal to a scanned touch detection pad group, setting a common voltage of the scanned touch detection pad group to a reference ground, and sending the sensing signal to be a common voltage of a plurality of non-scanned touch detection pad groups to obtain a first detection result;
    performing a dummy touch detection operation on a first touch detection group of the touch detection pad groups by providing the sensing signal to the touch detection pads in the first touch detection group to obtain a second detection result during a dummy scan period, and setting a common voltage of a second touch detection group of a plurality of non-scanned touch detection pad groups to the reference ground during the dummy touch detection operation; and
    generating a water mode detection result according to the first detection result and the second detection result.

2. The water mode detection method according to claim 1, wherein the first touch detection group neighbors to the second touch detection group.

3. The water mode detection method according to claim 1, wherein a step of generating the water mode detection result according to the first detection result and the second detection result comprises:
    determining whether water touches on the in-cell touch panel or not according to the second detection result.

4. The water mode detection method according to claim 3, wherein the step of generating the water mode detection result according to the first detection result and the second detection result further comprises:
    determining whether a touch media touching the in-cell touch panel with water or not according to the first detection result and the second detection result.

5. An in-cell touch apparatus, comprising:
    a touch panel, having a plurality of touch detection pad groups;
    a touch detector, coupled to the touch detection pad groups, being configured to:
    perform a normal touch detection operation on each of the touch detection pad groups during each of a plurality of normal scan periods by providing a sensing signal to a scanned touch detection pad group, setting a common voltage of the scanned touch detection pad group to a reference ground, and sending the sensing signal to be a common voltage of a plurality of non-scanned touch detection pad groups to obtain a first detection result; and
    perform a dummy touch detection operation on a first touch detection group of the touch detection pad groups by providing the sensing signal to the touch detection pads in the first touch detection group to obtain a second detection result during a dummy scan period;
    a common voltage provider, coupled to the touch detection pad groups, setting a common voltage of a second touch detection group of a plurality of non-scanned touch detection pad groups to the reference ground during the dummy touch detection operation; and
    a controller coupled to the touch detector and the common voltage provider, receiving the first detection result and the second detection result, and generating a water mode detection result according to the first detection result and the second detection result.

6. The in-cell touch apparatus according to claim 5, wherein the first touch detection group neighbors to the second touch detection group.

7. The in-cell touch apparatus according to claim 5, wherein the controller is configured to:
    determine whether water touches on the in-cell touch panel or not according to the second detection result.

8. The in-cell touch apparatus according to claim 5, wherein the controller is further configured to:
    determine whether a touch media touching the in-cell touch panel with water or not according to the first detection result and the second detection result.

* * * * *